(12) United States Patent
Corcoran

(10) Patent No.: US 9,411,835 B1
(45) Date of Patent: Aug. 9, 2016

(54) METHOD AND SYSTEM FOR VALIDATING DATA INTEGRITY

(71) Applicant: J. C. Taylor Antique Automobile Agency, Inc., Upper Darby, PA (US)

(72) Inventor: William L. Corcoran, Garnet Valley, PA (US)

(73) Assignee: J. C. Taylor Antique Automobile Agency, Inc., Upper Darby, PA (US)

( * ) Notice: Subject to any disclaimer, the term of this patent is extended or adjusted under 35 U.S.C. 154(b) by 159 days.

(21) Appl. No.: 13/948,754

(22) Filed: Jul. 23, 2013

Related U.S. Application Data

(60) Provisional application No. 61/674,536, filed on Jul. 23, 2012.

(51) Int. Cl.
*G06F 17/30* (2006.01)

(52) U.S. Cl.
CPC .................. *G06F 17/30303* (2013.01)

(58) Field of Classification Search
None
See application file for complete search history.

(56) References Cited

U.S. PATENT DOCUMENTS

| | | | |
|---|---|---|---|
| 8,010,509 B1 * | 8/2011 | Khurana et al. | 707/690 |
| 8,726,066 B1 * | 5/2014 | Natanzon et al. | 714/4.11 |
| 2003/0149736 A1 * | 8/2003 | Berkowitz et al. | 709/213 |
| 2006/0129608 A1 * | 6/2006 | Sato et al. | 707/200 |
| 2011/0099435 A1 * | 4/2011 | Wu | 714/54 |

* cited by examiner

*Primary Examiner* — Albert Phillips, III
(74) *Attorney, Agent, or Firm* — Saul Ewing LLP

(57) ABSTRACT

A method of validating data between a first system and at least one second system, wherein the first and second systems have corresponding data volumes, the method comprising isolating first and second data volumes in the first and second systems respectively, wherein the first and second data volumes comprise the corresponding data volumes; generating a checksum for the first and second data volumes; comparing the checksum between the first and second data volumes; and indicating an error if the checksum between the first and second data volumes is different; and inserting results into a database for reporting, for event monitoring or for statistical analysis.

13 Claims, 1 Drawing Sheet

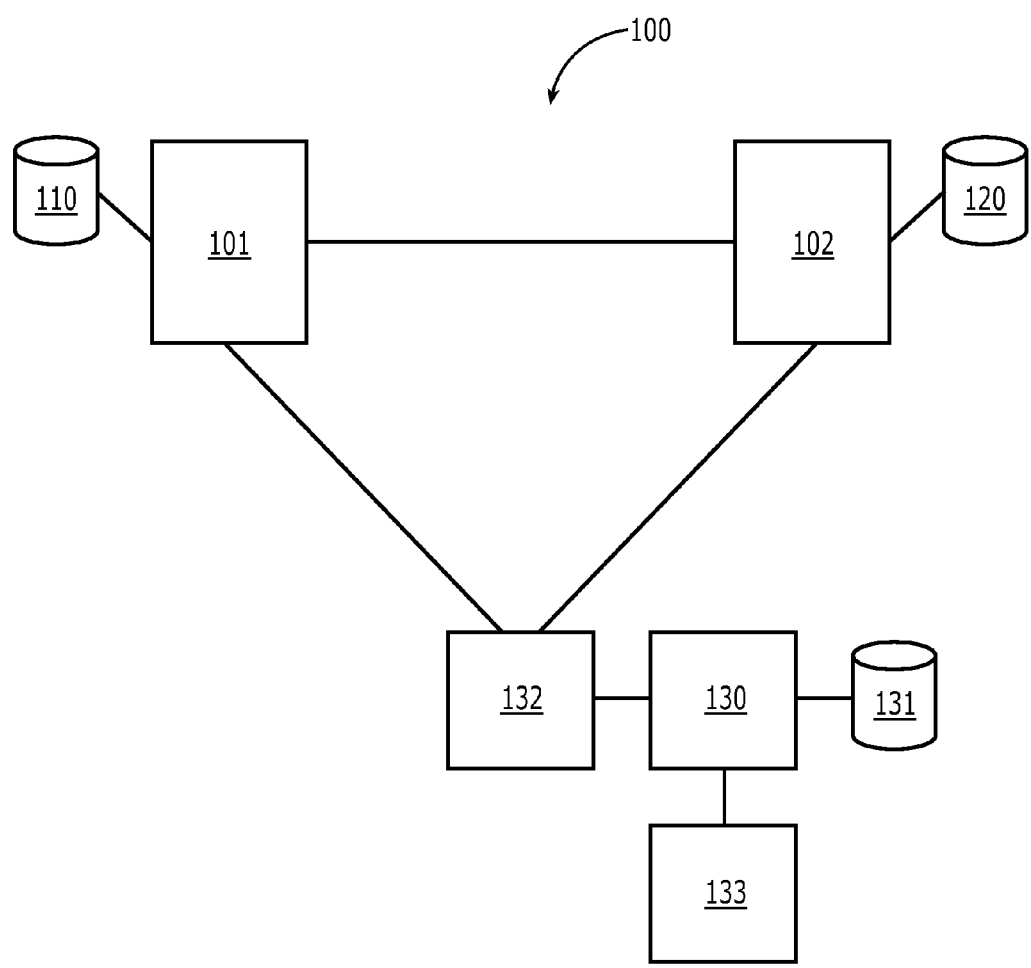

METHOD AND SYSTEM FOR VALIDATING DATA INTEGRITY

CROSS REFERENCE TO RELATED APPLICATIONS

This application claims priority to U.S. Provisional Application No. 61/674,536 filed Jul. 23, 2012, the entire disclosure of which is hereby incorporated herein by reference.

FIELD OF INVENTION

The invention relates generally to an approach for validating data integrity, and, more specifically, to a method and system for validating data integrity between replicated systems.

BACKGROUND OF INVENTION

Replication is a term of art where the data maintained in one geographic location is transparently copied between one storage system and another storage system usually located in another geographic location. In general, "transparency" refers to the fact that the computer systems relying upon the replicated data have no knowledge or awareness that the replication of data is taking place. The distance between these storage systems can span from micrometers to kilometers. Typically replication is carried out for disaster recovery purposes. This relieves the software and hardware of the computer systems and other devices relying upon the replicated data from the burden of undertaking the steps involved with replicating the data.

In a typical replicated system, data are initially copied without regard to temporal sequencing. (Temporal sequencing refers to time sequencing. The initial copy is typically made as a whole without reference to time; therefore, the initial copy is not time sequenced.) Once the initial copying of data has completed, the storage system typically switches modes and begins to temporally sequence any subsequent changes made to the storage system. Such transactions provided in temporal sequence are typically said to be made in "journal mode."

Many systems relying upon storage systems have volume management operations that can tolerate failure so long as the data on any specific storage system are temporally sequenced. Thus, journaling is an important element of modern replicated storage systems.

It is important to remember that data cannot be physically added to or removed from a storage system. Instead, the bit patterns residing on the storage device are changed so that its bit pattern matches the pattern desired by the computer systems and other devices relying upon the data. For example, a newly initialized storage system may contain all zeros representing a blank area on the storage system. The computer or other device relying on this data may change these zeros to a different pattern representing the data to be stored for persistent use. In turn, the source storage system will take the steps to copy this pattern to the replicated target.

The concept of data storage virtualization increases the complexity of the operations described above. The storage system typically presents its available storage in a conventional form familiar to the computer or device. However, the storage system is under no obligation to interact with the data in the same manner as a conventional device. For example, a typical device may be presented as a LUN (Logical Unit Number) to the computer. In conventional terms, a LUN may consist of an entire disk mechanism (i.e., disk drive.) However, the storage system is free to spread this data across countless disks or other storage devices or media. The computer relying on this data would "understand" that this virtual LUN consists of only a single disk mechanism; while, in fact, the single LUN is actually a collection of multiple disk devices. This is only one of many examples of virtualization.

Replicated storage systems can be manufactured by a single vendor. Additionally, multiple vendors can be used in designing a replicated storage system. The concept of virtualization permits the use of different storage systems manufactured by one or more vendors. The primary constraint in using one or more dissimilar storage systems for replication requires that the total amount of replicated storage space is limited to the smaller of the source or target storage systems.

The software, hardware, and firmware of the replicated storage system generally functions to ensure that the data contained in the source system matches the target system. The storage systems typically use their own storage to create the structures to support the underlying data used or accessed by computers or devices. Storage system uses "structural data" to provide a map to the where data is stored in its system. This structural data may include, for example, information on logical volume managers or files systems. This structural data is referred to herein as "super-meta-data." Super-meta-data used by a given storage system is typically not visible (i.e., accessible) to the computers and data accessing the storage system as it is particular to the local storage system. Super-meta-data would generally not be replicated between storage systems.

To be clear, one would find no difference when examining a virtual LUN presented by a storage system as an array of linear bytes, and comparing this to a replicated copy of the image that was maintained on a single conventional LUN (disk drive.) The super-meta-data maintained on the storage system would be used to produce the data in proper sequence from the various underlying storage devices used by the storage system. (Although the conventional LUN (disk drive) used in our example does, in fact, rely upon super-meta-data as a means to spare bad blocks, for example, the storage system super-meta-data may involve multiple disk caches and disk mechanisms where the single conventional LUN would involve only a single disk mechanism.)

Most modern storage systems have ways to ensure that the data on the source matches the target. However, replicated storage systems with identical hardware and firmware configurations will not share the same super-meta-data. As a result, replicated storage systems are not exact copies of one another. Thus, a direct comparison is not meaningful for validating the integrity of the replicated data. In addition, the performance of the storage system would suffer if one were to attempt to compare the entire replicated LUN on a byte-by-byte basis.

To avoid these difficulties, many replicated storage systems employ an "end to end" checksum as a means to ensure data integrity. However, this test only compares a small portion of the data and does not examine the data in its entirety. End-to-end checksumming may ensure that the data traveling across the network remains intact; however, it does not ensure that the data will land in the proper place within the storage system. Such algorithms tend to be very specific to a class of storage systems. In addition, the end-user of the data has to rely on the accuracy of the algorithms and the end-user has to forgo any verification that the data has landed in the proper place within the storage system.

Therefore, applicant has identified a need for a data validation approach between replicated systems that verifies the integrity of the entire data volume and not just a transmission. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention exploits the virtualization process between replicated systems to group data logically such that it can be verified using a straightforward checksum approach. In this way, the approach avoids the problem of differing super-meta-data of different systems introducing dissimilar data into the checksum and ultimately undermining the verification of the storage system. Rather, the present invention uses the virtualization infrastructure to permit the data maintained by the storage system to be categorized into a near limitless number of groupings for the purposes of managing the storage system. For example, the data may be presented as a LUN, but may consist of a series of sub-groupings called a LUSE. By grouping the data in this way, the validation system of the present invention does not require any review of the super-meta-data or any understanding of the internal groupings, such as a LUSE, contemplated by the storage system.

It is also important to understand that by looking at the data in the same way a computer would access the data, any presentable storage partition, group, or LUN can be viewed as a linear array of bytes. Thus, this disclosure reveals that by removing the complexities of virtualization and the difficulties brought on by super-meta-data, the replicated data can be directly validated between its source and target to ensure they match with an extremely high degree of confidence. By taking advantage of the virtualization within the storage system during data examination, the invention actually eliminates its complexities.

One aspect of the invention is a method of validating data between a first system and at least one second system, wherein said first and second systems have corresponding data volumes. In one embodiment, the method comprises: (a) isolating first and second data volumes in said first and second systems respectively, wherein said first and second data volumes comprise said corresponding data volumes; (b) generating a checksum for said first and second data volumes; (c) comparing said checksum between said first and second data volumes; and (d) indicating an error if said checksum between said first and second data volumes is different.

Another aspect of the invention is a system for validating data between a first system and at least one second system, wherein said first and second systems have corresponding data volumes. In one embodiment, the system comprises: (a) a processor; (b) a data store; (c) interconnection to said first and second systems; and (d) memory operatively connected to said processor and configured to instruct said processor to execute the following steps: (i) isolating first and second data volumes in said first and second systems respectively, wherein said first and second data volumes comprise said corresponding data volumes; (ii) generating a checksum for said first and second data volumes; (iii) comparing said checksum between said first and second data volumes; and (iv) indicating an error if said checksum between said first and second data volumes is different.

DETAILED DESCRIPTION

In one embodiment, the method comprises: (a) isolating first and second data volumes in said first and second systems respectively, wherein said first and second data volumes comprise said corresponding data volumes; (b) generating a checksum for said first and second data volumes; (c) comparing said checksum between said first and second data volumes; and (d) indicating an error if said checksum between said first and second data volumes is different. Furthermore, a means to validate the temporal sequencing of the replicated data is also disclosed. Next, a means to maintain a history, in tabular format for use in a database, is disclosed for the purposes of confirming the results of the validation. The invention is considered below in more detail and in connection with specific embodiment and pseudo code.

In one particular embodiment, the method of the present invention comprises the following steps.

1. An independent system partition is created with visibility of all LUNS on the source storage system.
2. An independent system partition is created with visibility of all LUNS on the target system(s).
3. The system partition scans for available LUNS.
4. Build a memory-based map of the source LUN.
5. Replication is suspended between the storage systems.
6. We must wait for all transactions to flush from the journal.
7. No writes are permitted during this time. To minimize disruption the data can be "business copied" to an alternate LUN. Business copy LUNS typically require only the writes to be copied since the last involcation.
8. Perform a quick and dirty scan of the header (the first 8,000 bytes) and write the resulting checksum to an internal structure along with other pertinent data, such as LUN name, LUN size, etc.
9. Once the business copy of the storage has been completed then the source storage system can be returned to normal production use. In practice, when combined with a properly configured real-time business copy the storage array down-time can be reduced to mere seconds or even eliminated entirely.
10. Release the system for writes (if necessary) (production use).
11. To rule out major inconsistencies, we read the first 8000 bytes of the source LUN and write the result to a table.
12. To rule out major inconsistencies, we read the first 8000 bytes of the target LUN and write the result to a table.
13. We compare the values from the table and notify the operator of any errors via email.

In one embodiment, the verification is performed on a business copy. (If a business copy is not available, then work must be stopped until the verification is complete.) For example, a business copy may be established and validated using the following process:

```
main( ){
sourcePrepare( );
targetPrepare( );
enableReplication( );
notifyProductiUseNowAvailable( );
validateSourceQuickAndDirty( ); /* Note: placed into
    background */
validateTargetQuickAndDirty( ); /* Note: placed into
    background*/
waitForValidateSource( );
```

```
    waitForValidateTarget( );
    compareQuickAndDirty( );
    validateSource( ); /* Note: placed into background */
    validateTarget( ); /* Note: placed into background*/
    waitForValidateSource( );
    waitForValidateTarget( );
    compareFull( );
}
sourcePrepare( ){
    lunScanSource( );
    buildReplicatedMapSource( );
    suspend( );
    waitForJournalFlush( );
    resyncBusinessCopy( );
}
targetPrepare( ){
    lunScanTarget( );
    build ReplicatedMapTarget( );
    resyncBusinessCopy( );
}
validateSourceQuickAndDirty( ){
    readHeader(1800);
    computeCheckSum( );
    writeResultSql( );
}
```

In one embodiment, the method quickly determines if there is data corruption by generating a checksum only on a header (of any size) of each volume. If the headers do not match, then data corruption is detected. The header is particularly important because that is where the "super-block" metadata resides

```
    validateTargetQuickAndDirty( ){
        readHeader(1800);
        computeCheckSum( );
        writeResultSql( ):
    }
    compareQuickAndDirty( ){
        pullDataViaSql( );
        compareCheckSums( );
        notifyDiscrepancy( );
    }
    validateSource( ){
        readEntireLUN( );
        computeCheckSum( );
        writeResultSql( ):
    }
    validateTarget( ){
        readEntireLUN( );
        computeCheckSum( );
        writeResultSql( ):
    }
```

In one embodiment, if the header described above checks out but further verification is desired, the entire data volume is checked. This embodiment involves running a whole scan, putting the checksum data in a table, and then putting it in a compare table. In this particular embodiment, the "compare full" is a hash function to expedite checking. It should be understood that the hash function may also be used to check just the headers as described above.

Compression: unix
```
    compareFull {
        pullDataViaSql( );
        compareCheckSums( );
        notifyDiscrepancy( );
    }
```

Referring to FIG. 1, in yet another embodiment, the invention is a system 100 for validating data between a first system 110 and at least one second system 120, wherein said first and second systems have corresponding data volumes 111, 121, respectively. In one embodiment, the system 100 comprises: (a) a processor 101; (b) a data store 102; (c) interconnection 103 to said first and second systems; and (d) memory 104 operatively connected to said processor and configured to instruct said processor to execute the following steps: (i) isolating first and second data volumes in said first and second systems respectively, wherein said first and second data volumes comprise said corresponding data volumes; (ii) generating a checksum for said first and second data volumes; (iii) comparing said checksum between said first and second data volumes; and (iv) indicating an error if said checksum between said first and second data volumes is different.

What is claimed is:

1. A method of validating data between a first system and at least one second system, wherein said first and second systems have corresponding data volumes comprising headers, said method comprising:
   (a) isolating first and second data volumes in said first and second systems respectively, wherein said first and second data volumes comprise said corresponding data volumes;
   (b) generating a checksum for at least one corresponding header of each of said first and second data volumes;
   (c) comparing said checksum between said first and second data volumes, comprising comparing said checksum for said corresponding header between said first and second data volumes, comprising generating a checksum table of all data in said first and second data volumes if said checksum for said corresponding header of said first and second data volumes is different;
   (d) indicating an error if said checksum between said first and second data volumes is different; and
   (e) inserting results into a database for reporting, for event monitoring or for statistical analysis.

2. The method of claim 1, wherein, in step (a), isolating data comprises freezing a business copy, said business copy comprising said first and second data volumes.

3. The method of claim 1, wherein said first and second data volumes comprise any presentable storage partitions, groups, logical unit numbers (LUNs), or sub-groupings (LUSE).

4. The method of claim 3, wherein, in step (b) said corresponding data volumes comprise one or more LUNs in said first system and one or more corresponding LUNs in said second system.

5. The method of claim 1, wherein step (a) comprises scanning said first and second data volumes for available LUNS.

6. The method of claim 1, wherein said corresponding data comprises headers, and wherein step (b) comprises generating a checksum for at least one corresponding header of each of said first and second data volumes, and step (c) comprises comparing said checksum for said corresponding header between said first and second data volumes.

7. The method of claim 6, wherein step (b) comprises reading just a minor portion of said first and second data volumes LUN and writing said checksum to a table.

8. The method of claim 6, wherein step (b) comprises writing said checksum to an internal structure along with other pertinent data, such as LUN name and LUN size.

9. The method of claim 1, further comprising prior to step (a) creating a first independent system partition with visibility of all first data volumes, and creating a second independent system partition with visibility of all second data volumes.

10. The method of claim 9, wherein said first and second independent system partitions are business copies.

11. The method of claim 10, wherein, when making said business copies, suspending replication between said first and second storage systems, and waiting until all transactions flush from journal.

12. The method of claim 11, wherein, once said business copies have been completed, returning said first and second storage systems to normal production use.

13. The method of claim 1, wherein step (d) comprises transmitting an electronic notice of an error to an operator of said first or second storage system.

* * * * *